165. DESIGNS,
STOVES & FURNACES,
Stove Attachments.

Designs 10
136

H. L. PALMER,

Assignor of one-half interest to C. C. SKILTON.

Non-Conducting Platform.

Re No. 8,697. Reissued Design, May 6, 1879.

Fig. 1.

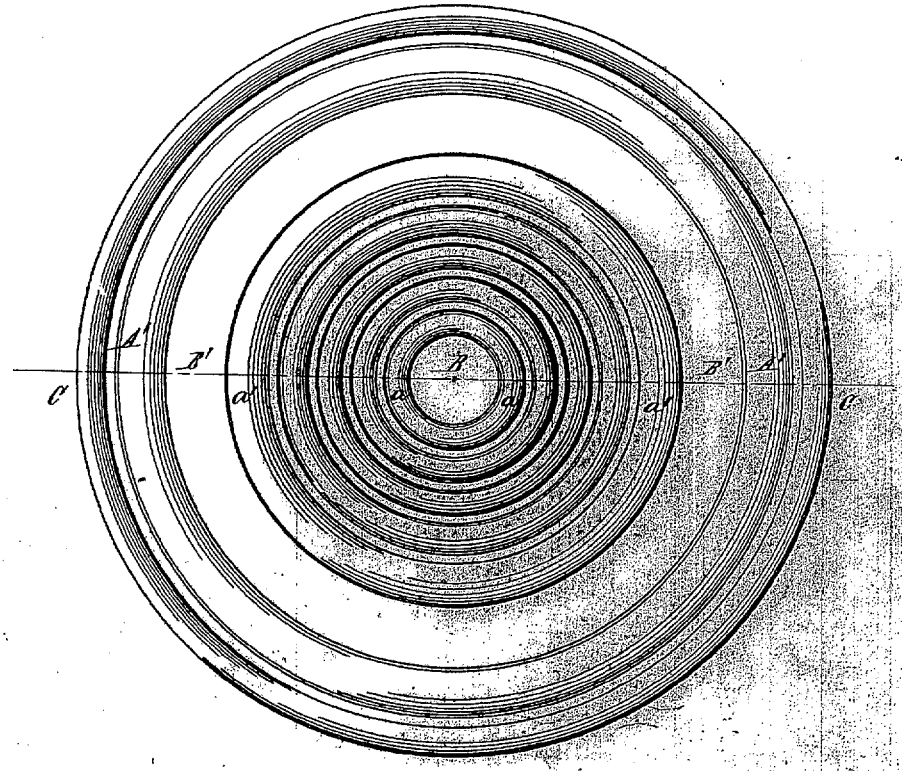

Fig. 2.

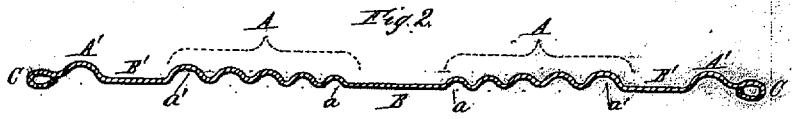

Witnesses:
Chas. H. Searle,
W. J. Morgan.

Henry L. Palmer,
Inventor,
By Worth Osgood,
Attorney.

Examined April 11, 1879.

Henry L. Palmer Assignor of 1/2 interest to L. Skilton
Design for Non-Conducting Platform Patented May 6, 1879

Old Pat. July 7, 1874

THE NATIONAL ARCHIVES
NATIONAL ARCHIVES AND RECORDS SERVICE
GENERAL SERVICES ADMINISTRATION

BEST AVAILABLE COPY

BEST AVAILABLE COPY

UNITED STATES PATENT OFFICE.

HENRY L. PALMER, OF BROOKLYN, NEW YORK, ASSIGNOR OF ONE-HALF INTEREST TO CHARLES C. SKILTON.

DESIGN FOR NON-CONDUCTING PLATFORM.

Specification forming part of Design No. 7,527, dated July 7, 1874; Reissue No. 8,697, dated May 6, 1879; application filed February 10, 1879.

*To all whom it may concern:*

Be it known that I, HENRY L. PALMER, of the city of Brooklyn, in the county of Kings and State of New York, have invented, originated, or produced a new and useful Design for Platforms or Mats, of which design the following is a full, clear, and exact description, reference being had to the accompanying drawings, and to the letters of reference marked thereon.

Figure 1 is a top or plan view of a platform or mat embodying my design, and Fig. 2 represents a vertical section through the center of Fig. 1.

Like letters in both figures indicate corresponding parts.

My invention, origination, or production has special relation to the æsthetic appearance of that class of platforms or mats ordinarily intended for use beneath stoves, and commonly denominated "stove-platforms" or "non-conducting platforms;" but inasmuch as the invention is in no way circumscribed by the dimensions of the article, the design is alike applicable to either large or small platforms or mats intended for non-conducting purposes.

The distinctive characteristic features of the design intended to be covered hereby consist, essentially, in a relief of the dull, unbroken surface of the old and well-known styles of platforms or mats by a tasteful, artistic, and pleasing assemblage of flat or plain sections, located upon the same level or in substantially the same plane, said sections being bordered by parallel beads, corrugations, moldings, or elevations of the surface of the mat, which (aside from their actual manifest utility in affording strength, which functional quality is not of importance herein) contribute an appearance of combined strength and lightness, continuity of ornamental outline, and a graceful union of curved and rectilinear elements. These characteristic features, together with their inner dependent combinations, will be hereinafter first fully described, and then pointed out in the claims.

B is a central flat portion of the non-conducting platform or mat, encompassed by a bead or corrugation, *a*. B′ is a second flat portion of the mat, the outer and inner edges of which are bordered or limited by the beads or corrugations A′ and *a*′, respectively, giving to it the appearance of an annular section protected on both edges by an appropriate molding, the parts B and B′ being located, as plainly indicated, upon the same level or in the same plane, and the beads or corrugations all springing from and returning to this plane, as would naturally result from making the mat of a single sheet of metal, as shown in the drawings.

Outside of the molding A′ is a return molding or bead, C, on the extreme edge of the platform or mat, so formed as to conceal the sharp edge of the metal or other material of which the article may be made, and affording a finished appearance to the completed device. The several corrugations are formed so as to be substantially parallel with each other and with the finished edge, as shown, thereby presenting a symmetrically-ornamental surface.

The relative locations of the prominent distinguishing features of the design may probably be (in the claims) best indicated by brief reference to their respective diameters. Thus the bead *a*′ is of less diameter than the flat portion B′, and so on.

The group or series A, composed of concentric corrugations, as shown, separate the flat or uncorrugated portions B and B′ from each other, and the two elements A′ and C form a limited series of finishing elevations. These two series of separate and distinct elevations or beads are among the minor features of the invention, as previously intimated.

As will be seen from an inspection of the drawings, the molded edge C is connected with the next interior rib or corrugation by a shallow reversed arch or gradually-curved surface, the curve of the arch being continued gracefully from the rib or corrugation to the molded edge, affording an appearance of rigidity at this part of the mat. This is one of the prominent features or elements of the design, although it is by no means intended to limit the scope of the claims to this prominent feature, unless in such wherein it is specifically designated; and the same is true in regard to the minor features named herein.

It will be observed that the extreme edge of the mat or platform presents a completelyfinished appearance, and that the raw edge of the metal is turned underneath the mat, so as not to show above it, as in those mats wherein the edge is not turned under, or wherein it is turned about a strengthening or stiffening wire, all of which in this class of mats or platforms tends to destroy the finished effect which it is the object of my invention to communicate.

I desire also to acknowledge the previous existence of mats or platforms wherein the center is raised considerably above the surrounding rim and joint therewith by an abrupt vertical wall, and ornamented with numerous beads or corrugations, though not with such a finished or molded edge as contemplated herein. This previous style of mat or platform fails to give the characteristic appearance above alluded to, and, moreover, fails to show the gradually-curved surface connecting the molded edge with the adjacent rim. To it I desire it understood that I make no claim; but,

Having now fully described my design, what I do claim as new, and desire to secure by Letters Patent, is—

1. In a design for a platform or mat having a finished edge, the extremity or raw portion thereof being concealed in the manner specified, a bead or corrugation parallel with said edge, an annular flat portion smaller in diameter than said bead or corrugation, a second bead or corrugation smaller in diameter than said annular flat portion, and a centrally-located flat portion, these several elements being located in or springing from substantially the same plane, and being otherwise combined and arranged substantially as herein shown and described.

2. The design for a non-conducting platform composed of concentric beads or corrugations A A′, flat or plain portions B B′, and a return-molding, C, substantially as herein set forth.

In testimony that I claim the foregoing I have hereunto set my hand and affixed my seal in the presence of two witnesses.

HENRY L. PALMER. [L. S.]

Witnesses:
WORTH OSGOOD,
CHAS. R. SEARLE.